US009372786B1

(12) United States Patent
Peracha et al.

(10) Patent No.: US 9,372,786 B1
(45) Date of Patent: Jun. 21, 2016

(54) CONSTRUCTING STATE-TRANSITION FUNCTIONS FOR MOBILE DEVICES

(75) Inventors: Zahur A. Peracha, Irvine, CA (US); Calvin Y. Kuo, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 552 days.

(21) Appl. No.: 13/495,437

(22) Filed: Jun. 13, 2012

(51) Int. Cl.
*G06F 11/00* (2006.01)
*G06F 11/36* (2006.01)

(52) U.S. Cl.
CPC ........ *G06F 11/3688* (2013.01); *G06F 11/3684* (2013.01)

(58) Field of Classification Search
USPC ........................................... 714/47.1, 48, 4.1
See application file for complete search history.

(56) References Cited

U.S. PATENT DOCUMENTS

| 8,370,679 B1* | 2/2013 | Gawali et al. ...................... 714/3 |
| 2004/0230861 A1* | 11/2004 | Bailey et al. ....................... 714/6 |
| 2005/0144532 A1* | 6/2005 | Dombrowa et al. ............. 714/39 |
| 2007/0079170 A1* | 4/2007 | Zimmer et al. .................... 714/6 |
| 2008/0109683 A1* | 5/2008 | Erwin et al. ...................... 714/46 |
| 2008/0127177 A1* | 5/2008 | Oh et al. ......................... 717/174 |
| 2009/0271661 A1* | 10/2009 | Miyai et al. ..................... 714/35 |
| 2009/0322557 A1* | 12/2009 | Robb et al. ................. 340/870.3 |
| 2011/0016355 A1* | 1/2011 | Watanabe et al. ............... 714/37 |
| 2011/0161743 A1* | 6/2011 | Kato ............................ 714/47.2 |
| 2011/0191639 A1* | 8/2011 | Shinohara et al. .............. 714/54 |
| 2012/0072769 A1* | 3/2012 | Goldszmidt et al. ............ 714/15 |
| 2012/0116590 A1* | 5/2012 | Florez-Larrahondo et al. ............................ 700/275 |
| 2013/0117337 A1* | 5/2013 | Dunham ....................... 707/827 |

* cited by examiner

*Primary Examiner* — Sarai Butler
(74) *Attorney, Agent, or Firm* — Thomas | Horstemeyer, LLP

(57) ABSTRACT

Disclosed are various embodiments for a state monitoring application. A state monitoring application initiates the execution of test operations on a client device. States of the client device are monitored to determine when the client device is at risk of entering an unresponsive state. When the client device is at risk, the state monitoring application initiates the execution of remedy operations to prevent the client device from becoming unresponsive.

24 Claims, 4 Drawing Sheets

CONSTRUCTING STATE-TRANSITION FUNCTIONS FOR MOBILE DEVICES

BACKGROUND

Mobile devices can be tested by executing a series of operations on the device. Testing becomes difficult when executing these operations puts the device in a non-responsive state.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed are various embodiments of a state-transition function for mobile devices. Testing applications on mobile devices requires accounting for numerous hardware and operating system configurations. This complicates the testing process, as executing identical test operations can produce different results across the different mobile device configurations. In some cases, a mobile device can enter an unresponsive state during the execution of the test operations due to some unique feature of the device configuration. Once a device becomes unresponsive, it requires a manual restart so that the test operations may resume execution. In order to prevent a required manual restart, a state-transition function can monitor the state of a mobile device. When the mobile device is at risk for becoming unresponsive, the state-transition function can initiate the execution of one or more remedy operations on the device so that the device is no longer at risk and the execution of test operations can resume without manual intervention. In the following discussion, a general description of the system and its components is provided, followed by a discussion of the operation of the same.

Figure 1:
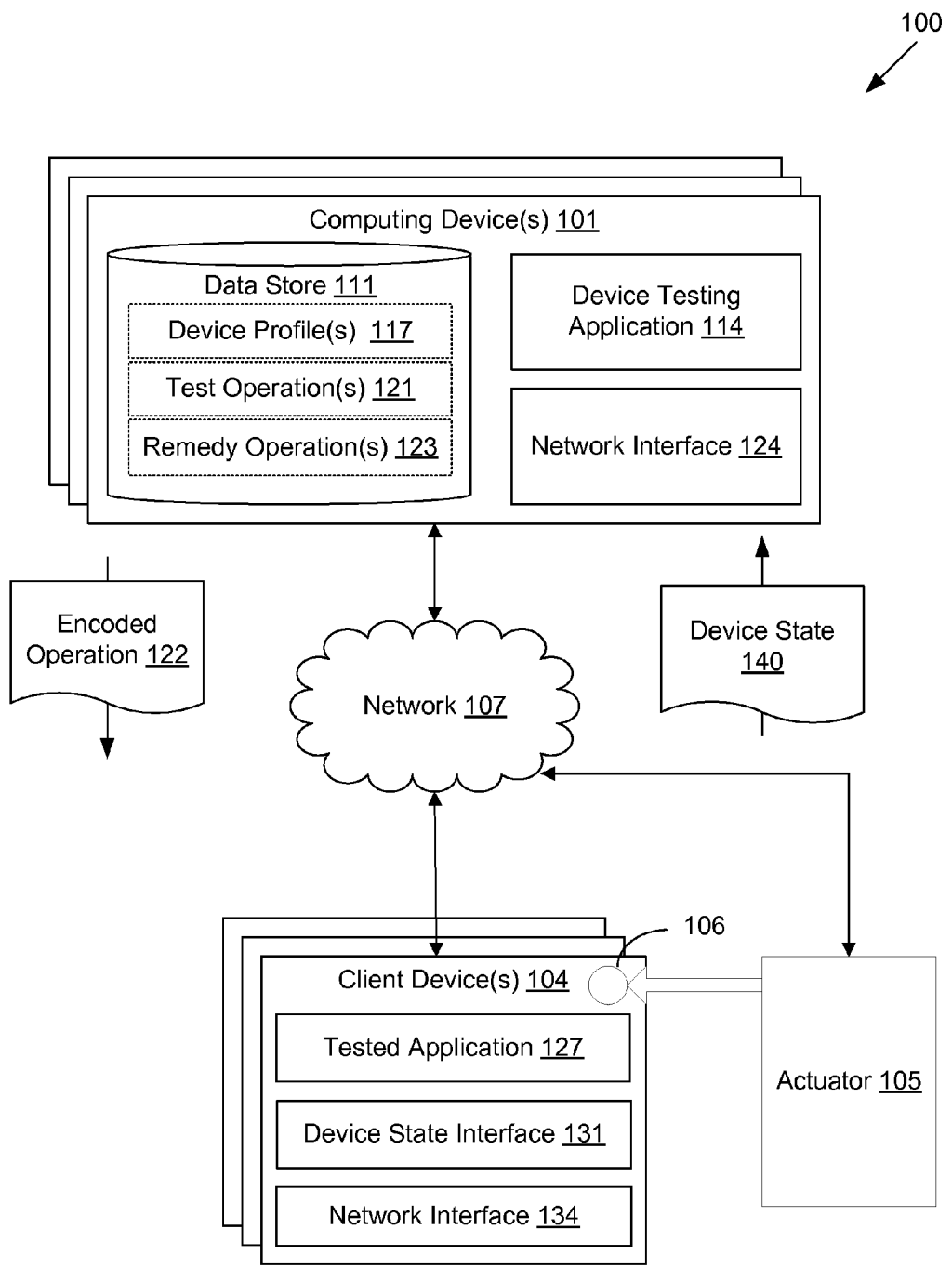
FIG. 1 is a drawing of the networked environment according to various embodiments of the present disclosure.

With reference to FIG. 1, shown is a networked environment 100 according to various embodiments. The networked environment 100 includes a computing device 101, a client device 104, an actuator 105, and potentially other devices coupled to a network 107. The network 107 includes, for example, the Internet, intranets, extranets, wide area networks (WANs), local area networks (LANs), wired networks, wireless networks, or other suitable networks, etc., or any combination of two or more such networks.

The computing device 101 may comprise, for example, a server computer or any other system providing computing capability. Alternatively, a plurality of computing devices 101 may be employed that are arranged, for example, in one or more server banks or computer banks or other arrangements. For example, a plurality of computing devices 101 together may comprise a cloud computing resource, a grid computing resource, and/or any other distributed computing arrangement. Such computing devices 101 may be located in a single installation or may be distributed among many different geographical locations. For purposes of convenience, the computing device 101 is referred to herein in the singular. Even though the computing device is referred to in the singular, it is understood that a plurality of computing devices 101 may be employed in the various arrangements as described above.

Various applications and/or other functionality may be executed in the computing device 101 according to various embodiments. Also, various data is stored in a data store 111 that is accessible to the computing device 101. The data store 111 may be representative of a plurality of data stores as can be appreciated. The data stored in the data store 111 for example, is associated with the operation of the various applications and/or functional entities described below.

The components executed on the computing device 101, for example, include a device testing application 114, and other applications, services, processes, systems, engines, or functionality not discussed in detail herein. The device testing application 114 is executed to initiate the execution of test operations 121 on client device 104.

A test operation 121 may comprise any interaction with client device 104, a tested application 127 executed on client device 104, an operating system, or any other component of client device 104. The test operation 121 may include terminal or command line interface commands to be executed on client device 104. Test operation 121 may also include gesture events or user interface interactions. Test operation 121 may comprise other commands or interactions with the client device 104, applications executed on client device 104, or other components of client device 104 as may be appreciated.

Device testing application 114 also obtains device states 140 from the client device 104 via network 107. The device state 140 comprises one or more attributes relating to the operational status of client device 104. Attributes contained within the device state 140 may comprise a number of open file handles, remaining battery power, central processing unit (CPU) usage, an amount of allocated memory, remaining disk space, used disk space, file input/output (I/O) statistics, power consumption rates, or other attributes.

Furthermore, device testing application 114 initiates the execution of remedy operations 123 when the device state 140 meets a condition defined in a device profile 117. Device profile 117 contains conditions which, when met by a client device 104, indicate that the device is at risk for entering an unresponsive state. A remedy operation 123 may comprise any interaction with client device 104, an application executed on client device 104, an operating system, or any other component of client device 104. The remedy operation 123 may include terminal commands, command line interface commands, gesture events, user interface interactions, or any other command, interaction, or operation, to be executed on client device 104. The remedy operation may also comprise a command to activate an actuator 105 which presses a power switch 106 located on the client device to shut down the device.

To these ends, the device testing application 114 may communicate with client device 104 over various protocols such as, for example, hypertext transfer protocol (HTTP), file transfer protocol (FTP), HTTP Secure (HTTPS), simple object access protocol (SOAP), representational state transfer (REST), user datagram protocol (UDP), transmission control protocol (TCP), and/or other protocols for communicating data over the network 107.

The data stored in the data store 111 includes, for example, device profiles 117, test operations 121, remedy operations 123 and potentially other data.

The client device 104 is representative of a plurality of client devices that may be coupled to the network 107. The client device 104 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client device 104 may be configured to execute various applications such as a tested application 127, a device state interface 131, and/or other applications. Device state interface 131 is executed to encode various attributes relating to the operational status of client device 104 into a device state 140. Device state interface 131 may comprise a service, process, or daemon of an operating system executed on client device 104. Device state interface may also comprise a stand-alone executable application executed on client device 104. It may also comprise other interfaces, logic, or applications executed on the client device 104. The client device 104 may be configured to execute applications beyond tested application 127 and device state interface 131 such as, for example, email applications, instant message applications, and/or other applications. Client device 104 comprises a network interface 134, to communicate with computing device 101 via network 107. When an encoded operation 122 is received by client device 104 through network interface 134, client device 104 executes the operations encoded therein.

The client device 104 may comprise a power switch 105 which shuts down the device when pressed. The power switch 105 may be a lever, switch, button, or other mechanical implement which controls the activation and deactivation of the client device 104. The actuator 105 may press the power switch 105 in response to an input from the computing device 101.

Next, a general description of the operation of the various components of the networked environment 100 is provided. To begin, computing device 101 executes a device testing application 114 in order to test a client device 104. Device testing application 114 selects a plurality of test operations 121 to be executed on the client device 104. For example, a test operation 121 may comprise uninstalling an application. In embodiments of the client device 104 that include a touch-screen interface, a test operation 121 may comprise a gesture event such as a two-finger swipe. A test operation 121 may further comprise selecting a user interface element from a tested application 127 executed on the client device 104. Test operations 121 may comprise other interactions, commands, gestures, or events executed on the client device 104. Test operations 121 may also comprise multiple gestures, commands, events, or other components with or without a specified order of execution.

Device testing application 114 initiates the execution of a test operation 121 on client device 104 by encoding the test operation 121 as encoded operation 122. Encoded operation 122 is then communicated to client device 104 via network 107 using network interface 124. Client device 104 receives encoded operations 122 from computing device 101 via network 107 through network interface 134, as well as other communications. Client device 104 then executes the test operation 121 encoded in the encoded operation 122. The test operation 121 may define tasks performed in relation to a tested application 127 executed on the client device 104, or some other component of client device 104. For example, when executing a test operation 121 comprising a user interface event relating to tested application 127, event handling logic within tested application 127 will execute as if the client device 104 had received user interface input. When executing a test operation 121 comprising a touch screen gesture event, client device 104 will perform as if a user had input the gesture event into the touch screen interface. Other test operations 121 may be executed, as well. Furthermore, multiple test operations 121 may be executed in a predefined sequence or at random.

Device testing application 114 next obtains a device state 140 from client device 104 by communicating with the device state interface 131 executed on client device 104 via network 107. Device state interface 131 encodes various attributes relating to the operational status of client device 104 into a device state 140, which is then communicated to computing device 101 via network 107. In some embodiments, device state 140 comprises one or more file or data objects encoding the attributes relating to client device 104. In other embodiments, device state 140 comprises a stream of encoded attributes. Device state 140 may encode the attributes of client device 104 in other data structures or formats as may be appreciated. Device state 140 may be sent or accessed periodically or at predefined times. In some embodiments, device state 140 is communicated by client device 104 to computing device 101 in response to a request sent by computing device 101. In other embodiments, client device communicates device state 140 to computing device 101 at a predefined interval. Other methods of communicating a device state 140 may also be used.

Device testing application 114 compares the device state 140 to one or more device profiles 117 corresponding to the client device 104. Each device profile 117 defines conditions which, based on a device state 140 associated with the client device 104, indicate when the client device 104 is at risk for entering an unresponsive state. In one embodiment, the conditions may comprise an attribute encoded in the device state 140 being above or below a threshold amount. In another embodiment, the conditions may comprise an attribute encoded in the device state 140 being outside a predefined range. In yet another embodiment, the condition may comprise multiple attributes encoded in the device state 140 simultaneously falling outside predefined ranges or simply having predefined values within ranges indicating problems may occur. Other conditions relating to the device state 140 may also be defined in the device profile 117. Conditions may be preprogrammed or created in response to operating conditions of a client device 104 contemporaneous to or after the execution of one or more test operations 121.

In response to the client device 104 meeting a condition defined within the device profile 117, device testing application 114 can initiate the execution of a remedy operation 123 on client device 104 to attempt to place the client device 104 out of risk for entering an unresponsive state. The remedy operation 123 can comprise one or more operations, commands, executions, gestures, events, or processes relating to the operation of client device 104 or component thereof, including any service, application, or process executed on client device 104, or other components. For example, a remedy operation 123 may comprise terminating an execution of a service or daemon on the client device 104. In another example, a remedy operation 123 may comprise restarting the client device 104. In a further example, a remedy operation 123 may comprise shutting down the client device 104. Other remedy operations 123 may also be executed. The remedy operation 123 is then encoded as an encoded operation 122, and communicated to client device 104 for execution. The device testing application 114 may then obtain a device state 140 to determine if the client device 104 still meets a condition defined within the device profile 117.

Figure 2:
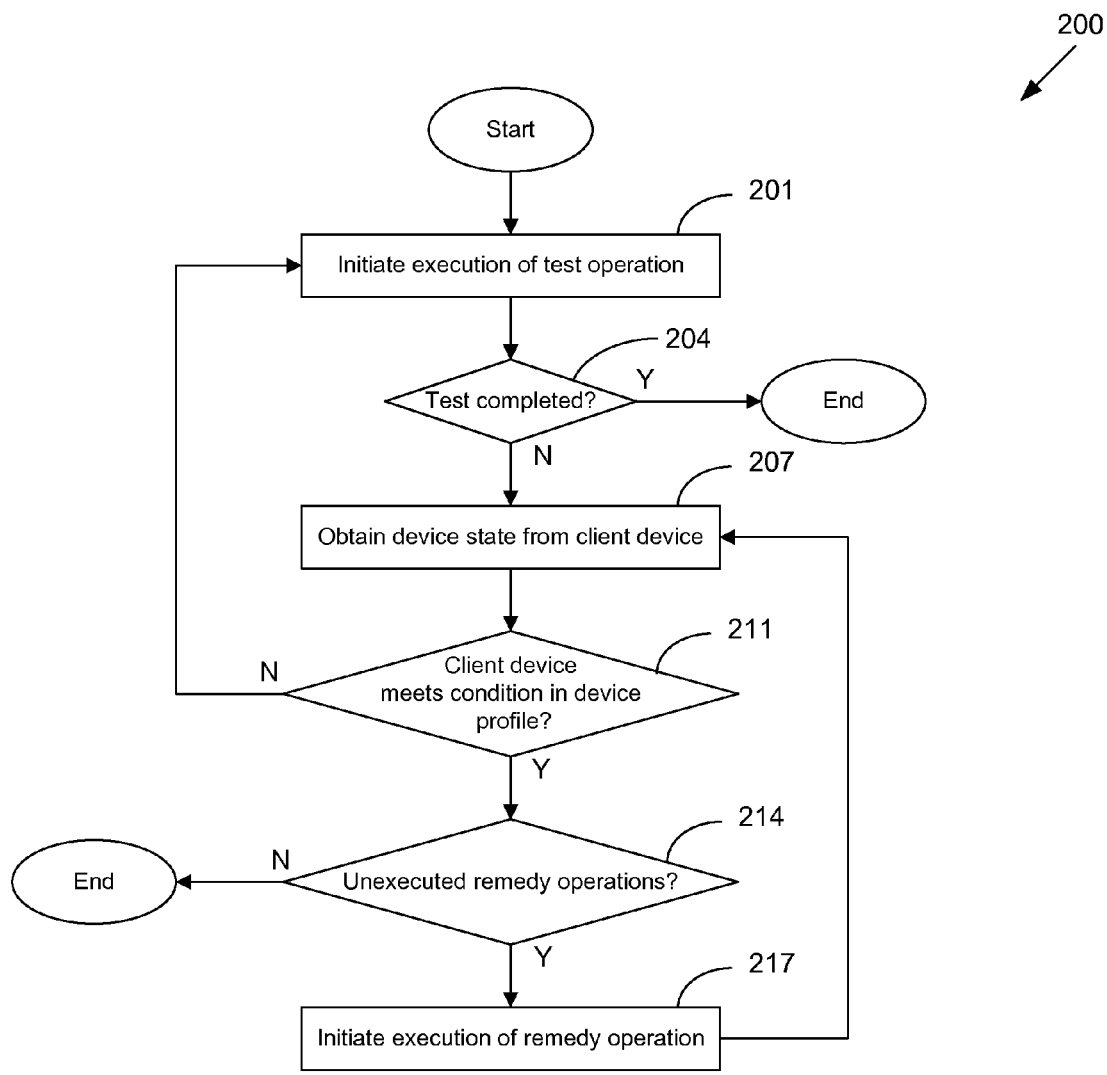
FIG. 2 is a flowchart illustrating one example of functionality implemented as portions of the state-transition function executed in a computing device in the networked environment of FIG. 1 according to various embodiments of the present disclosure.

Referring next to FIG. 2, shown is a flowchart that provides one example of the operation of a portion of the device testing application 114 (FIG. 1) according to various embodiments. It is understood that the flowchart of FIG. 2 provides merely an example of the many different types of functional arrangements that may be employed to implement the operation of the portion of the device testing application as described herein. As an alternative, the flowchart of FIG. 2 may be viewed as depicting an example of steps of a method implemented in the computing device 101 (FIG. 1) according to one or more embodiments.

The operation of FIG. 2 is performed by the device testing application 114. The device testing application 114 initiates the execution of a series of test operations 121 (FIG. 1) on a client device 104 (FIG. 1). After each test operation 121, the device testing application 114 then obtains a device state 140 (FIG. 1) from client device 104 to determine if the client device 104 is at risk for entering an unresponsive state. If the client device 104 is at risk, the device testing application 114 initiates the execution of remedy operations until the client device 104 is no longer at risk. Once the client device 104 is no longer at risk, the execution of test operations 121 continues.

Beginning with box 201, device testing application 114 initiates the execution of a test operation 121. The test operation 121 is encoded as an encoded operation 122 (FIG. 1) and communicated to the client device 104. In embodiments in which the test operation 121 comprises a single operation, the client device 104 executes the operation defined therein. In embodiments in which the test operation 121 comprises multiple operations, the operations may be executed in a specified execution order or a random order.

Moving to box 204, the device testing application 114 determines if all test operations 121 have been executed by the client device 104. If so, testing has completed. If not, as shown in box 207, the device testing application 114 obtains a device state 140 from client device 104. This is accomplished by a device state interface 131 (FIG. 1) executed on client device 104 encoding various attributes relating to the operation of client device 104 into a device state 140. Device state 140 is then communicated to the computing device 101 (FIG. 1).

Next, in box 211, the device testing application 114 determines if the client device 104 meets a condition defined in a device profile 117 (FIG. 1). This is accomplished by comparing the device state 140 obtained in box 207 to one or more conditions defined in the device profile 117. For example, in one embodiment the device profile 117 may define a condition as the client device 104 having more than 1000 file handles open. The device testing application 114 determines if the open file handles attribute encoded in the device state 140 exceeds 1000. In another embodiment, the device profile 117 may define a condition as the battery power having less than 10%. As another example, the device profile 117 may define a condition as the CPU usage exceeding 80%. Other conditions may be defined in the device profile 117.

In another embodiment, the device profile 117 may define a condition in which multiple attributes must be within predefined ranges or have predefined values simultaneously. For example, the condition may comprise a battery level below 25% and a CPU usage exceeding 80%. The device testing application 114 would look to the battery level and CPU usage attributes encoded in the device state 140 to determine if both attributes are within the ranges defined in the condition. Other conditions defined in the device profile 117 may be compared to other attributes encoded in the device state 140.

If the client device 104 does meet a condition defined in the device profile 117, the device testing application 114 attempts to execute a remedy operation 123 (FIG. 1) from a plurality of available remedy operations 123 in order to put the client device 104 in a state where it does not meet a condition defined in the device profile 117. In box 214, the device testing application 114 determines if there are unexecuted remedy operations. If every available remedy operation 123 has been executed, then the operation of FIG. 2 ends. In such situations, the client device 104 is in such a state that the device testing application 114 cannot intervene to place the client device 104 outside of a risk state.

In box 217, should there be unexecuted remedy operations 123, the device testing application 114 initiates the execution of an unexecuted remedy operation 123. In some embodiments, this comprises initiating the execution of the remedy operation 123 on the client device 104. This is accomplished by encoding the remedy operation 123 as an encoded operation 122 (FIG. 1) and communicating it to the client device 104 for execution. In other embodiments, initiating the execution of an unexecuted remedy operation 123 comprises directing an actuator 105 (FIG. 1) to press a power switch 106 on the client device 104. The remedy operation 123 to be executed may be determined through several means. In one embodiment, the remedy operation 123 may be selected at random from the unexecuted remedy operations 123. In another embodiment, the remedy operation 123 may be selected based upon a history of success associated with executing the remedy operation 123 on the client device. In a further embodiment, the remedy operation 123 may be selected based on its position in a predefined ordered list of remedy operations 123. The remedy operation 123 may also be selected based on other criteria or methods.

Next, the process returns to box 207 to obtain another device state from the client device 104. This is used to determine if the remedy operation 123 had an effect such that the client device 104 no longer meets a condition defined in the device profile 117. Boxes 207, 211, 214, and 217 are repeated until the client device 104 no longer meets a condition defined in the device profile 117 as shown in box 211, or there are no remaining unexecuted remedy operations 123 as shown in box 214. If the client device 104 no longer meets a device profile 117 condition, the device testing application 114 resumes initiating the execution of test operations on the client device as shown in box 201.

Figure 3:
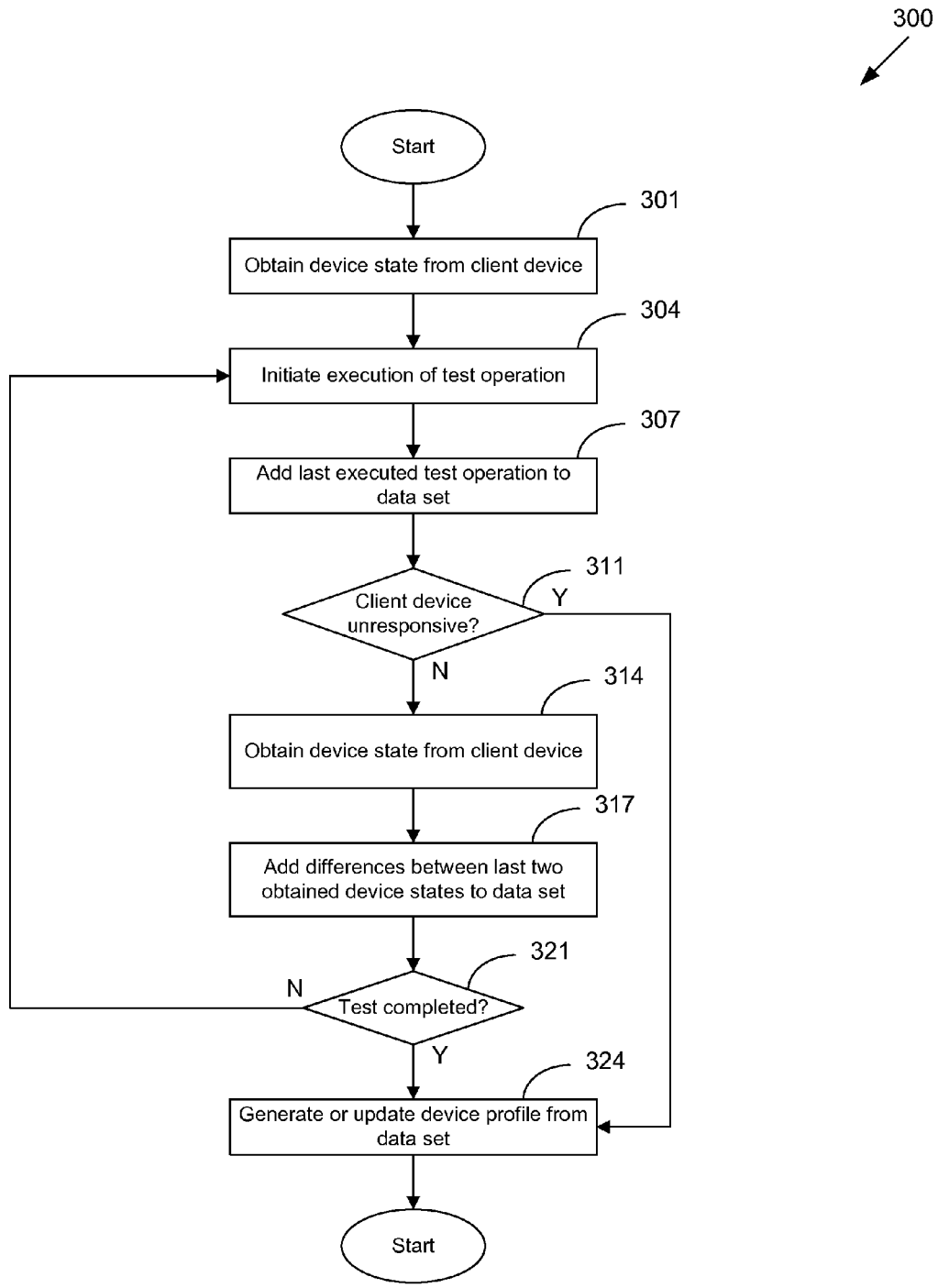
FIG. 3 is a flowchart illustrating one example of sampling data to create a device profile implemented in the state-transition function executed in a computing device in the networked environment of FIG. 1 according to various embodiments of the present disclosure.

Referring next to FIG. 3, shown is a flowchart that provides one example of the creation of a device profile 117 (FIG. 1) according to various embodiments. It is understood that the flowchart of FIG. 2 provides merely an example of the many different types of functional arrangements that may be employed to implement the operation of the portion of the device testing application as described herein. As an alternative, the flowchart of FIG. 3 may be viewed as depicting an example of steps of a method implemented in the computing device 101 (FIG. 1) according to one or more embodiments.

FIG. 3 describes one embodiment of an operation to create a device profile 117. As has been described with reference to FIG. 1 and FIG. 2, a device profile 117 defines conditions which, when met, indicate a device is at risk of entering an unresponsive state. To define these conditions, device testing application 114 (FIG. 1) obtains a device state 140 (FIG. 1) from the client device 104 (FIG. 1) before and after the client device 104 executes a test operation 121 (FIG. 1). The pairs of device states 140 are compared to determine what changes occurred with respect to the device state 140 as a result of the client device 104 executing the test operation 170 (FIG. 1). Both the changes to the device state 140 and the executed test operation 121 are added to a data set, from which a device profile 117 is later generated.

Beginning with box 301, device testing application 114 obtains a device state 140 from client device 104. As previously described, the device state interface 131 (FIG. 1) generates a device state 140 by encoding various attributes relating to the operational status of the client device 104. The device state is then communicated to the device testing application 114 via network 107 (FIG. 1).

In box 304, the device testing application 114 initiates the execution of a test operation 121 by communicating the test operation 121 as an encoded operation 122 to the client device 104. Upon receiving the encoded operation 122 (FIG. 1), client device 104 then executes the test operation 121 encoded therein. In box 307, the test operation 121 is added to a data set from which the device profile 117 may be generated.

In box 311, the device testing application 114 determines if client device 104 has entered an unresponsive state. In some embodiments this is accomplished through attempting to obtain a device state 140. In other embodiments, this is accomplished by communicating a request to the client device 104 and waiting a predetermined amount of time for a response. In further embodiments, this may be accomplished by determining if a data stream or signal originating from the client device 104 has been terminated. Other methods and techniques can also be used to determine if the client device 104 has entered an unresponsive state. If the client device 104 has entered an unresponsive state then a device profile 117 is generated or updated in box 324.

If the client device 104 has not entered an unresponsive state after executing test operation 121, another device state 140 is obtained in box 314. In box 317, the two most recently obtained device states 140 (one device state 140 obtained before and another after the execution of test operation 121) are compared. This determines what changes occurred in client device 104 due to the execution of the test operation 141. For example, the differences between the device states 140 may indicate that executing test operation 121 resulted in 25 new file handles being opened, and a 5% reduction in battery power. In another example, a test operation 121 may comprise installation and uninstallation of an application. The changes in the device states 140 may show a 50-megabyte increase in allocated memory, indicative of leaking data. Other attribute comparisons may be made, as well. Data relating to the differences between the two most recently obtained device states 140 is then added to a data set.

Moving to box 321, if the test has not been completed the FIG. 3 moves to box 304. Boxes 304 through 321 are repeated until the test has been completed as shown in box 321, or the client device 104 enters an unresponsive state as shown in box 311. Once the client device 104 enters an unresponsive state or the test is completed, box 324 generates or updates a device profile 117.

In box 324, a device profile 117 is generated or updated. A new device profile 117 is generated in cases where an associated client device 104 does not have an existing device profile 117. If the associated client device 104 does have an existing device profile 117, the existing device profile 117 is updated to add, change, delete, or otherwise modify conditions included in the device profile. A device profile 117 can be generated or updated using a data set comprising executed test operations 121 as shown in box 307, differences between obtained device states as shown in box 317, precalculated or known data relating to client device 104 including hardware specifications, data relating to the operating system of client device 104, or other data. In some embodiments, the device profile 117 is generated or updated as a function of user input. In other embodiments, the device profile 117 is generated or updated based on a supervised machine learning algorithm, such as Bayesian statistics, kernel estimators, decision tree learning, case-based reasoning, or other algorithms. Other techniques, algorithms, and methods can also be used to generate or update the device profile. The device profile 117 will include conditions which, when met, indicate an associated client device 104 is at risk for entering an unresponsive state.

Figure 4:
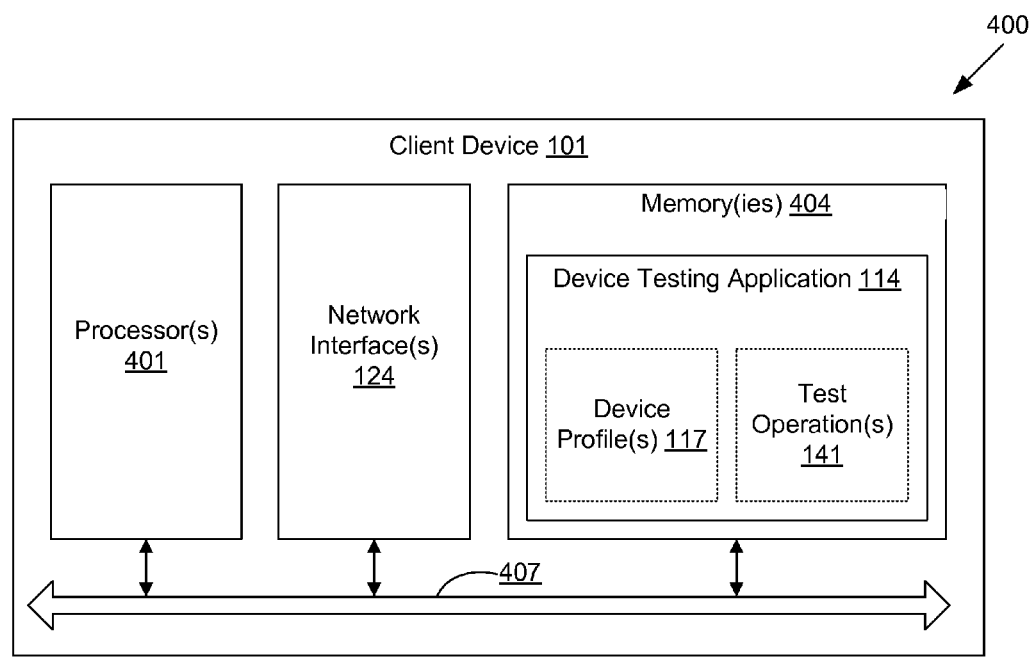
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 101 according to an embodiment of the present disclosure. The computing device 101 includes at least one processor circuit, for example, having a processor 401 and a memory 404, both of which are coupled to a local interface 407. To this end, the computing device 101 may comprise, for example, at least one server computer or like device. The local interface 407 may comprise, for example, a data bus with an accompanying address/control bus or other bus structure as can be appreciated.

Stored in the memory 404 are both data and several components that are executable by the processor 401. In particular, stored in the memory 404 and executable by the processor 401 are device testing application 114 (FIG. 1), and potentially other applications. Also stored in the memory 404 may be a data store and other data. In addition, an operating system may be stored in the memory 404 and executable by the processor 401.

It is understood that there may be other applications that are stored in the memory 404 and are executable by the processors 401 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 404 and are executable by the processor 401. In this respect, the term "executable" means a program file that is in a form that can ultimately be run by the processor 401. Examples of executable programs may be, for example, a compiled program that can be translated into machine code in a format that can be loaded into a random access portion of the memory 404 and run by the processor 401, source code that may be expressed in proper format such as object code that is capable of being loaded into a random access portion of the memory 404 and executed by the processor 401, or source code that may be interpreted by another executable program to generate instructions in a random access portion of the memory 404 to be executed by the processor 401, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 401 may represent multiple processors 401 and the memory 404 may represent multiple memories 404 that operate in parallel processing circuits, respectively. In such a case, the local interface 407 may be an appropriate network 107 (FIG. 1) that facilitates communication between any two of the multiple processors 401, between any processor 401 and any of the memories 404, or between any two of the memories 404, etc. The local interface 407 may comprise additional systems designed to coordinate this communication, including, for example, performing load balancing. The processor 401 may be of electrical or of some other available construction.

Although the device testing application 114 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the device testing application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 401 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including device testing application 114, that comprises software or code can be embodied in any non-transitory computer-readable medium for use by or in connection with an instruction execution system such as, for example, a processor 401 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program, when executed by the computing device, causing the computing device to at least:

initiate an execution of a plurality of test operations on a client device;

obtain, during the execution of the test operations, a state associated with the client device comprising a central processing unit usage, a battery level, a file input/output rate, an allocated file handle value, an allocated memory value, and an amount of stored data;

determine, during the execution of the test operations, when to initiate an execution of a plurality of remedy operations on the client device based on a device profile;

wherein the device profile defines one or more conditions in which the remedy operations should be executed, and the device profile is based on a history of states associated with the client device and a history of executed test operations associated with the client device; and wherein the remedy operations comprise terminating an execution of a service on the client device, shutting down the device, and restarting the device.

2. The computer-readable medium of claim 1, wherein the execution of the remedy operations based on a history of executed remedy operations.

3. The computer-readable medium of claim 1, wherein the execution of the remedy operations comprises executing the remedy operations in a predefined sequence.

4. The computer-readable medium of claim 1, wherein the device profile is further based on applying a supervised machine-learning algorithm to a data set comprising the history of states associated with the client device and the history of executed test operations associated with the client device.

5. A system, comprising:
at least one computing device configured to at least:
   initiate an execution of a plurality of test operations on a client device;
   determine, during the execution of the test operations, when a state of the client device meets a condition specified in a device profile, the condition indicating an imminent entry into an unresponsive state by the client device;
   initiate, when the state of the client device meets the condition, an execution of a remedy operation on the client device; and
   wherein the device profile is derived from a history of states associated with the client device.

6. The system of claim 5, wherein the at least one computing device is further configured to obtain the state of the client device.

7. The system of claim 5, wherein the device profile is derived from a history of executed test operations associated with the client device.

8. The system of claim 5, wherein the condition comprises multiple attributes associated with the state of the client device simultaneously falling within predefined ranges.

9. The system of claim 5, wherein the remedy operation is selected as a function of prior success associated with the use of the remedy operation.

10. The system of claim 5, wherein the remedy operation comprises terminating an execution of a service on the client device.

11. The system of claim 5, wherein the remedy operation comprises restarting the client device.

12. The system of claim 5, further comprising an actuator, and wherein the at least one computing device is further configured to direct the actuator to press a power switch located on the client device.

13. The system of claim 5, wherein the state comprises a number of file handles allocated on the client device.

14. The system of claim 5, wherein the state comprises an amount of remaining battery power on the client device.

15. The system of claim 5, wherein the state comprises a central processing unit usage on the client device.

16. The system of claim 5, wherein the state comprises a virtual memory usage on the client device.

17. The system of claim 5, wherein the state comprises a file system consumption on the client device.

18. The system of claim 5, wherein the state comprises a network bandwidth usage of the client device.

19. A method, comprising:
   obtaining, in a computing device, an operational status of a client device;
   initiating an execution of a plurality of test operations on the client device;
   determining when the operational status of the client device suggests an imminent failure according to a predefined standard indicated in a device profile corresponding to the client device, the predefined standard being based at least in part on a history of operational statuses associated with the client device; and
   initiating an execution of a remedy operation on the client device in response to the operational status of the client device suggesting the imminent failure according to the predefined standard.

20. The method of claim 19, wherein the remedy operation is determined by a history of executed remedy operations associated with the client device.

21. The method of claim 19, wherein the predefined standard is derived from a history of executed test operations associated with the client device.

22. The method of claim 19, further comprising repeating the initiating the execution of the remedy operation on the client device, wherein the remedy operation is one of a plurality of remedy operations.

23. The method of claim 19, wherein the remedy operations are executed in a predefined sequence.

24. The method of claim 19, further complying applying a machine learning algorithm to the history of operational statuses to determine the predefined standard.

* * * * *